US012619537B2

(12) United States Patent
Chen et al.

(10) Patent No.: US 12,619,537 B2
(45) Date of Patent: May 5, 2026

(54) PROCESSOR WITH HIGH-CAPACITY LAST-LEVEL CACHE

(71) Applicant: Shanghai Zhaoxin Semiconductor Co., Ltd., Shanghai (CN)

(72) Inventors: Chen Chen, Beijing (CN); Qi Li, Beijing (CN); Yongjie Zhang, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 18/888,496

(22) Filed: Sep. 18, 2024

(65) Prior Publication Data

US 2025/0130941 A1 Apr. 24, 2025

(30) Foreign Application Priority Data

Oct. 19, 2023 (CN) .......................... 202311360470.4

(51) Int. Cl.
*G06F 12/0806* (2016.01)
(52) U.S. Cl.
CPC ...... *G06F 12/0806* (2013.01); *G06F 2212/60* (2013.01)

(58) Field of Classification Search
CPC ............. G06F 12/0806; G06F 2212/60; G06F 12/0897; G06F 12/0811; G06F 12/0893; G06F 12/0877
USPC ......................................... 711/118
See application file for complete search history.

(56) References Cited

U.S. PATENT DOCUMENTS

| 2011/0113199 A1* | 5/2011 | Tang ................... G06F 15/8069 |
| | | 711/143 |
| 2013/0268711 A1* | 10/2013 | Safranek ............. G06F 13/4004 |
| | | 710/308 |
| 2014/0195833 A1* | 7/2014 | Wang .................... G06F 1/3253 |
| | | 713/320 |
| 2020/0097423 A1* | 3/2020 | Chiang ................... G06F 13/40 |

* cited by examiner

*Primary Examiner* — Hashem Farrokh
(74) *Attorney, Agent, or Firm* — McClure, Qualey & Rodack, LLP

(57) ABSTRACT

A processor with a high-capacity last-level cache is shown, which includes a plurality of cores, a primary storage node, a plurality of cache slices corresponding to the cores, and a mesh-type interconnection structure. The cache slices are combined as a last-level cache. The mesh-type interconnection structure connects the primary storage node and the cache slices in a ring, and connects at least two cache slices non-adjacent to each other in the ring.

13 Claims, 5 Drawing Sheets

100

100

300

PROCESSOR WITH HIGH-CAPACITY LAST-LEVEL CACHE

CROSS REFERENCE TO RELATED APPLICATIONS

This Application claims priority of China Patent Application No. 202311360470.4, filed on Oct. 19, 2023, the entirety of which is incorporated by reference herein.

BACKGROUND OF THE DISCLOSURE

Field of the Disclosure

The present disclosure relates to processors, and, in particular, it relates to processors with a high-capacity last level cache (LLC).

Description of the Related Art

A processor generally includes cache memories. Data read from a primary memory may be temporarily stored in the cache memories. In kernel calculations, the cache memories are searched first. If the requested data can be found from the cache memories, there is no need to access the slow-speed primary memory.

Cache memories typically adopt a multi-level architecture. For a multi-core processor, the last-level cache (LLC) is external to the cores to be shared by the different cores.

The last level cache (LLC) may be composed of multiple cache slices to achieve a large capacity thanks to the development of computer systems.

How to use the multiple cache slices to create a large-capacity LLC without affecting the data transmission bandwidth among the cores, the LLC, and the primary memory is an important issue in this technical field.

BRIEF SUMMARY OF THE DISCLOSURE

This application introduces a mesh-type interconnection structure to improve the data transmission bandwidth among the cores, the last-level cache (LLC), and the primary memory.

A processor in accordance with an exemplary embodiment of the disclosure includes a plurality of cores, a primary storage node, a plurality of cache slices corresponding to the cores, and a mesh-type interconnection structure. The cache slices are combined as a last-level cache (LLC). The mesh-type interconnection structure connects the primary storage node and the cache slices in a ring, and connects at least two cache slices that are not adjacent to each other in the ring.

In this manner, data transmission bandwidth among the cores, the last-level cache (LLC), and the primary memory is considerably improved.

In an exemplary embodiment, the number of cache slices and the number of cores are both N. N is greater than 2. The cache slices are numbered from 0 to (N−1). The cores are numbered from 0 to (N−1). A ring connection formed by the primary storage node and the cache slices starts from the primary storage node, and then goes through the cache slices in numerical order, and then comes back to the primary storage node. The mesh-type interconnection structure connects two cache slices with non-adjacent numbers.

In an exemplary embodiment, N is an even number greater than 2. The cache slices numbered from 0 to (N/2−1) are arranged from a head row to a bottom row in a first column in the order in which they are numbered. The cache slices numbered from N/2 to (N−1) are arranged from a bottom row to a head row in a second column in the order in which they are numbered.

In an exemplary embodiment, the cache slices in the first column are aligned laterally to the cache slices in the second column. The mesh-type interconnection structure connects laterally-aligned cache slices in the first and second columns.

In an exemplary embodiment, the core and cache slice with the same number are connected to each other. The cores numbered from 0 to (N/2−1) corresponding to the cache slices numbered from 0 to (N/2−1) are located on a first side of the cache slices numbered from 0 to (N/2−1). The cores numbered from N/2 to (N−1) corresponding to the cache slices numbered from N/2 to (N−1) are located on a second side of the cache slices numbered from N/2 to (N−1). The second side is opposite to the first side. The primary storage node is arranged on the upper side of the first column and the second column.

In an exemplary embodiment, the mesh-type interconnection structure that connects the primary storage node and the cache slices in the ring further connects the cache slice numbered j with the cache slice numbered (N−1−j), where j=~[(N/2)−2].

In an exemplary embodiment, the two columns may have different numbers of cache slices. The cache slices numbered from 0 to M are arranged from a head row to a bottom row in a first column in the order in which they are numbered. The cache slices numbered from (M+1) to (N−1) are arranged from a bottom row to a head row in a second column in the order in which they are numbered. M is a number greater than 0 and less than N−2. The mesh-type interconnection structure connects laterally-adjacent cache slices in the first and second columns.

In an exemplary embodiment, the core and cache slice with the same number are connected to each other; and the mesh-type interconnection structure includes pairs of first-type communication lines between adjacent cache slices in the first column for bidirectional communication between the adjacent cache slices in the first column, pairs of first-type communication lines between adjacent cache slices in the second column for bidirectional communication between the adjacent cache slices in the second column, and pairs of first-type communication lines between laterally-aligned cache slices in the first and second columns for bidirectional communication between the laterally-aligned cache slices. In this manner, the mesh-type interconnection structure realizes communication between the cores and the last-level cache.

In an exemplary embodiment, the mesh-type interconnection structure includes a pair of second-type communication lines between the primary storage node and a cache slice numbered 0 for bidirectional communication between the primary storage node and the cache slice numbered 0, pairs of second-type communication lines between adjacent cache slices in the first column for bidirectional communication between the adjacent cache slices in the first column, a pair of second-type communication lines between the primary storage node and a cache slice numbered (N−1) for bidirectional communication between the primary storage node and the cache slice numbered (N−1), and pairs of second-type communication lines between adjacent cache slices in the second column for bidirectional communication between the adjacent cache slices in the second column. In this manner, the mesh-type interconnection structure realizes communication between the primary storage node and the last-level cache.

In an exemplary embodiment, the mesh-type interconnection structure includes third-type communication lines connecting the primary storage node and the cache slices in a unidirectional manner. In this manner, the mesh-type interconnection structure realizes transfer of control signals.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION OF THE DISCLOSURE

The following description is made for the purpose of illustrating the general principles of the disclosure and should not be taken in a limiting sense. The scope of the disclosure is best determined by reference to the appended claims.

Figure 1:
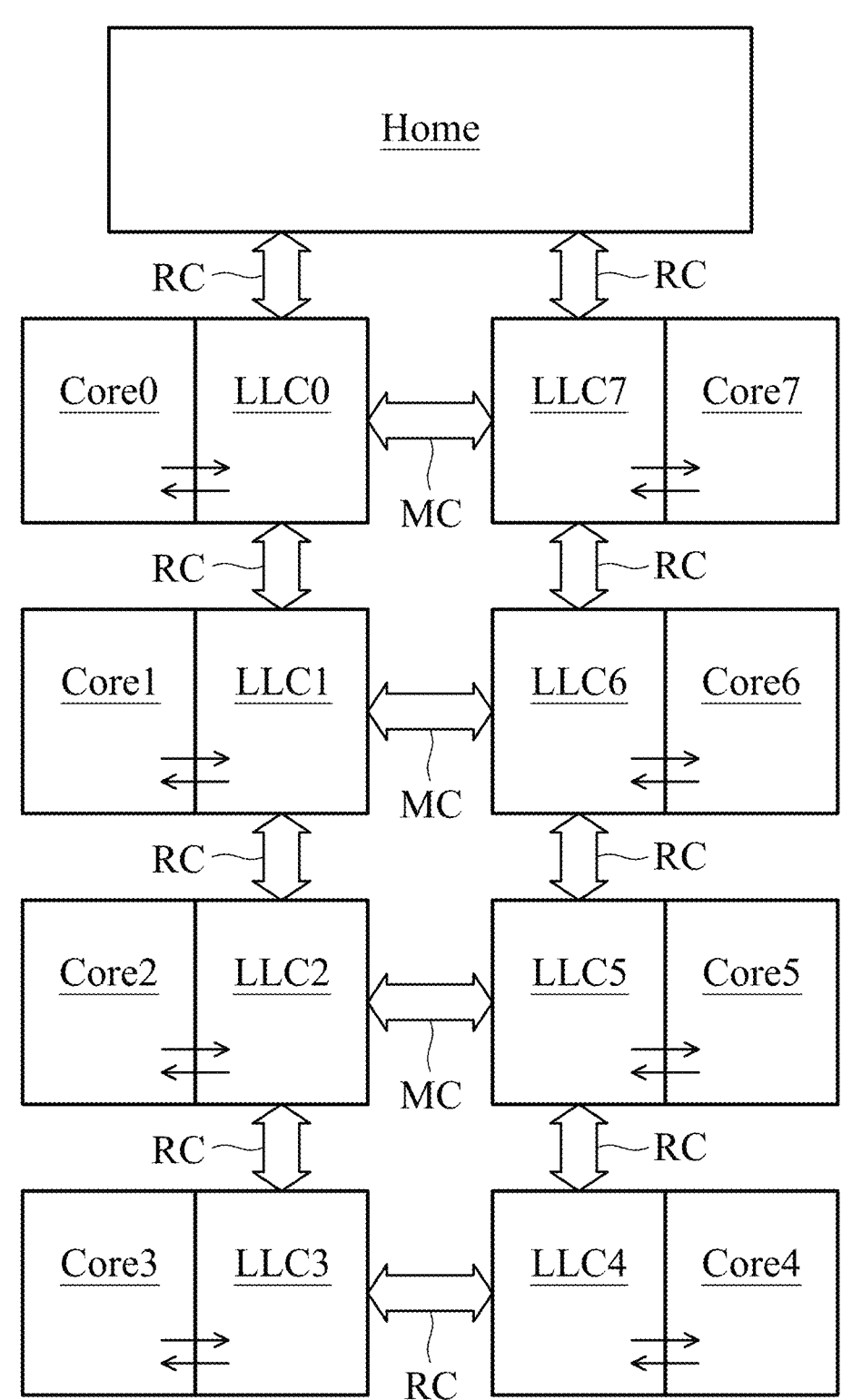
FIG. 1 illustrates a processor 100 in accordance with an exemplary embodiment of the disclosure.

FIG. 1 illustrates a processor 100 in accordance with an exemplary embodiment of the disclosure, which includes multiple cores Core0~Core7, a primary storage node Home, and multiple cache slices LLC0~LLC7. The cache slices LLC0~LLC7, corresponding to the cores Core0~Core7 one by one, form a high-capacity last-level cache (LLC) which is shared by the cores Core0~Core7. The primary storage node Home is operative to connect to a primary memory, such as connecting to a dynamic random access memory (DRAM) or connecting to a Peripheral Component Interconnect Express (PCIE) memory. Data read from the primary storage through the primary storage node Home may be cached in the LLC composed of the cache slices LLC0~LLC7. Thus, when the core Core0~Core7 request to access data, the time-consuming accessing to the primary memory is not necessary. Instead, the requested data can be quickly obtained from these cache slices LLC0~LLC7.

In particular, the processor 100 uses a mesh-type interconnection structure, including the interconnects labeled RC and MC in the figure. The interconnects RC connect the primary storage node Home and the cache slices LLC0 to LLC7 in a ring. The interconnects MC connect at least two cache slices that are not adjacent to each other in the ring. For example, the cache slices LLC0 and LLC7 (which are not adjacent to each other in the ring) are connected through an interconnect MC, the cache slices LLC1 and LLC6 (which are not adjacent to each other in the ring) are connected through an interconnect MC, and the cache slices LLC2 and LLC5 (which are not adjacent to each other in the ring) are connected through an interconnect MC. The interconnects MC are the fast paths between the cache slices.

The fast channels (established by the interconnects MC) introduced in this disclosure are not used in conventional design. In the conventional design, data paths between the cores Core0~Core7 and the LLC (from any core to any cache slice, or from any cache slice to any core) may be occupied by data communication between the LLC and the primary storage node Home (from any cache slice to the primary storage node Home, or from the primary storage node Home to any cache slice). In the conventional design, the system performance is poor. In comparison, the fast channels (established by the interconnects MC) introduced in this disclosure allow the cores Core0~Core7 to access the LLC (e.g. accessing any cache slice LLC0~LLC7) more smoothly, and the data bandwidth is improved.

FIG. 1 shows an example of eight cache slices. Other implementations of the mesh-type interconnection structure may have other numbers of cache slices.

Figure 2:
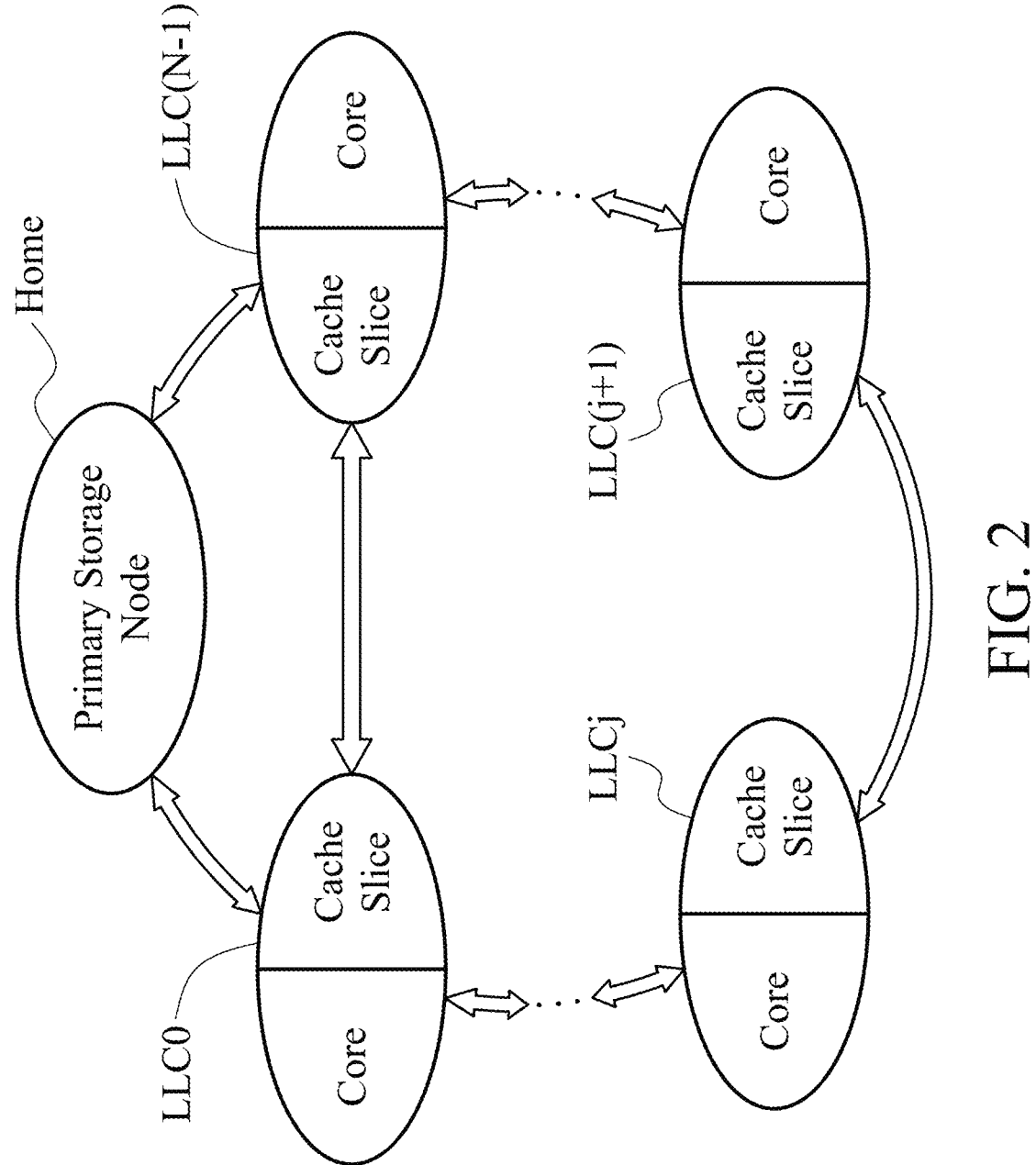
FIG. 2 illustrates the concept of the mesh-type interconnection structure of the disclosure.

FIG. 2 illustrates the concept of the mesh-type interconnection structure of the disclosure. The number of cache slices and the number of cores are both N (N>2). Numbered from 0 to (N−1), there are cache slices LLC0~LLC(N−1) and cores Core0~Core(N−1). A ring connection formed by the primary storage node Home and the cache slices LLC0~LLC(N−1) starts from the primary storage node Home, and then goes through the cache slices LLC0~LLC(N−1) in numerical order, and then comes back to the primary storage node Home. In any ring structure formed by a primary storage node Home and cache slices LLC0~LLC(N−1), as long as there is an interconnect between any pair of cache slices with non-adjacent numbers (e.g., referring to FIG. 2 that shows an interconnect between the cache slices LLC0 and LLC(N−1)), it relates to the concept of the mesh-type interconnection structure of this disclosure.

Figure 3:
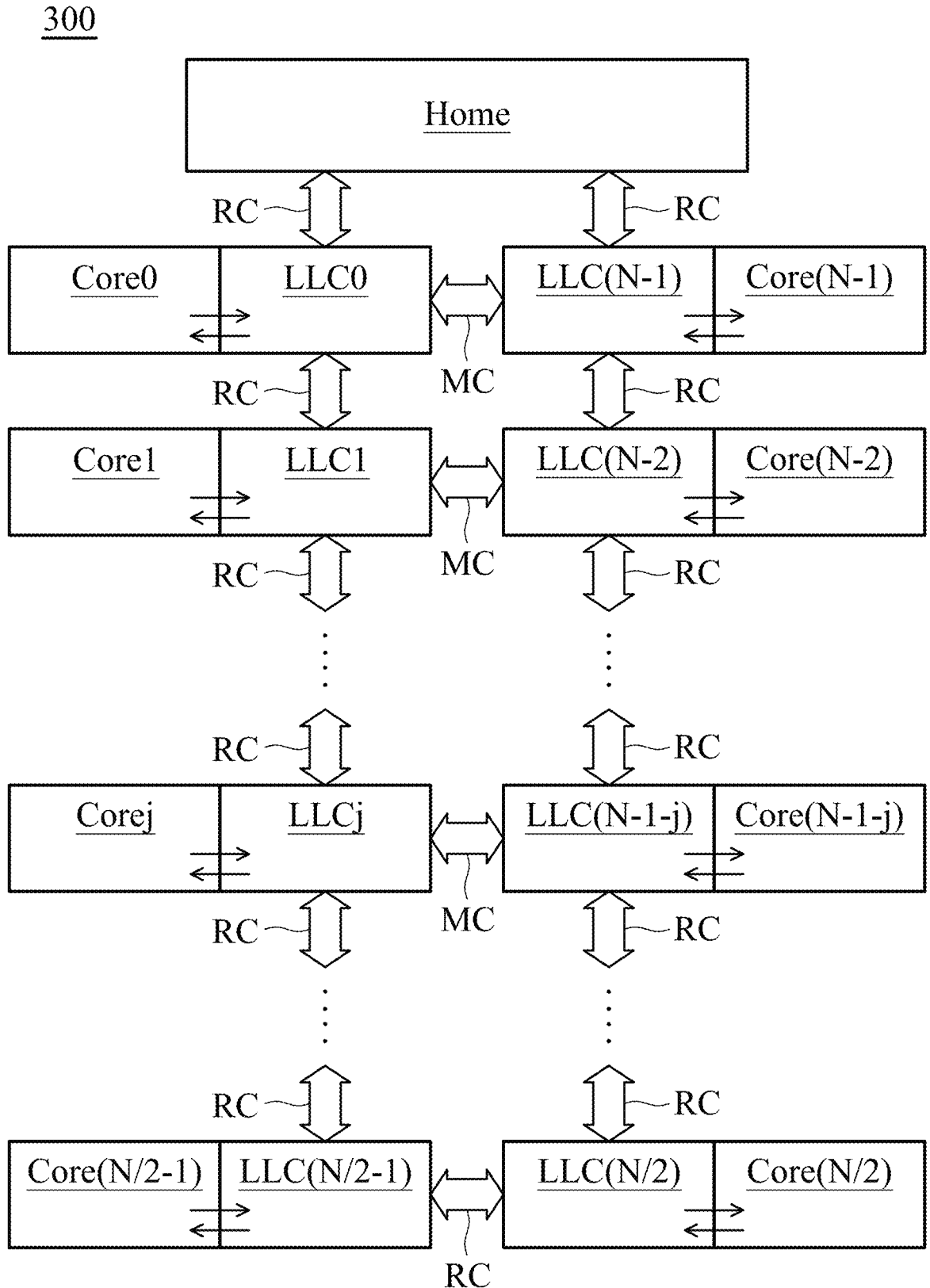
FIG. 3 illustrates a processor 300 in accordance with an exemplary embodiment of the disclosure, which includes N cores and N cache slices, where N is an even number greater than 2.

FIG. 3 illustrates a processor 300 in accordance with an exemplary embodiment of the disclosure, which includes N cores and N cache slices, where N is an even number greater than 2. Numbered from 0 to (N/2−1), the cache slices LLC0~LLC(N/2−1) are arranged in the first column from a head row to a bottom row in the order in which they are numbered. Numbered from N/2 to (N−1), the cache slices LLC(N/2)~LLC(N−1) are arranged in the second column from the bottom row to the head row in the order in which they are numbered. The cache slices of the first column and the cache slices of the second column are laterally aligned one-by-one. In the two columns, the laterally-aligned cache slices are connected to each other.

Specifically, the primary storage node Home and the cache slices LLC0~LLC(N−1) are connected in a ring and, to form the mesh-type interconnection structure, each pair of cache slices LLCj and LLC(N−1−j) (numbered j and (N−1−j), where j=0~(N/2)−2) are connected together. Based on the general concept introduced in FIG. 3, FIG. 1 illustrates an example of N=8.

This paragraph describes the details of the processor layout. There is an interconnect between the each pair of core and cache slice which have the same number. Numbered from 0 to (N/2−1), the cores core0~core(N/2−1) are located on a first side (as shown in the figure, left side) of the cache slices LLC0~LLC(N/2−1). Numbered from N/2 to (N−1), the cores core(N/2)~core(N−1) are located on a second side (as shown in the figure, right side) of the cache slices LLC(N/2)~LLC(N−1). The second side is opposite to the first side. The primary storage node Home is placed on the upper side of the first column and the second column.

The processor layout may be quite flexible and is not limited to the symmetrical layout illustrated in FIG. 3.

Figure 4:
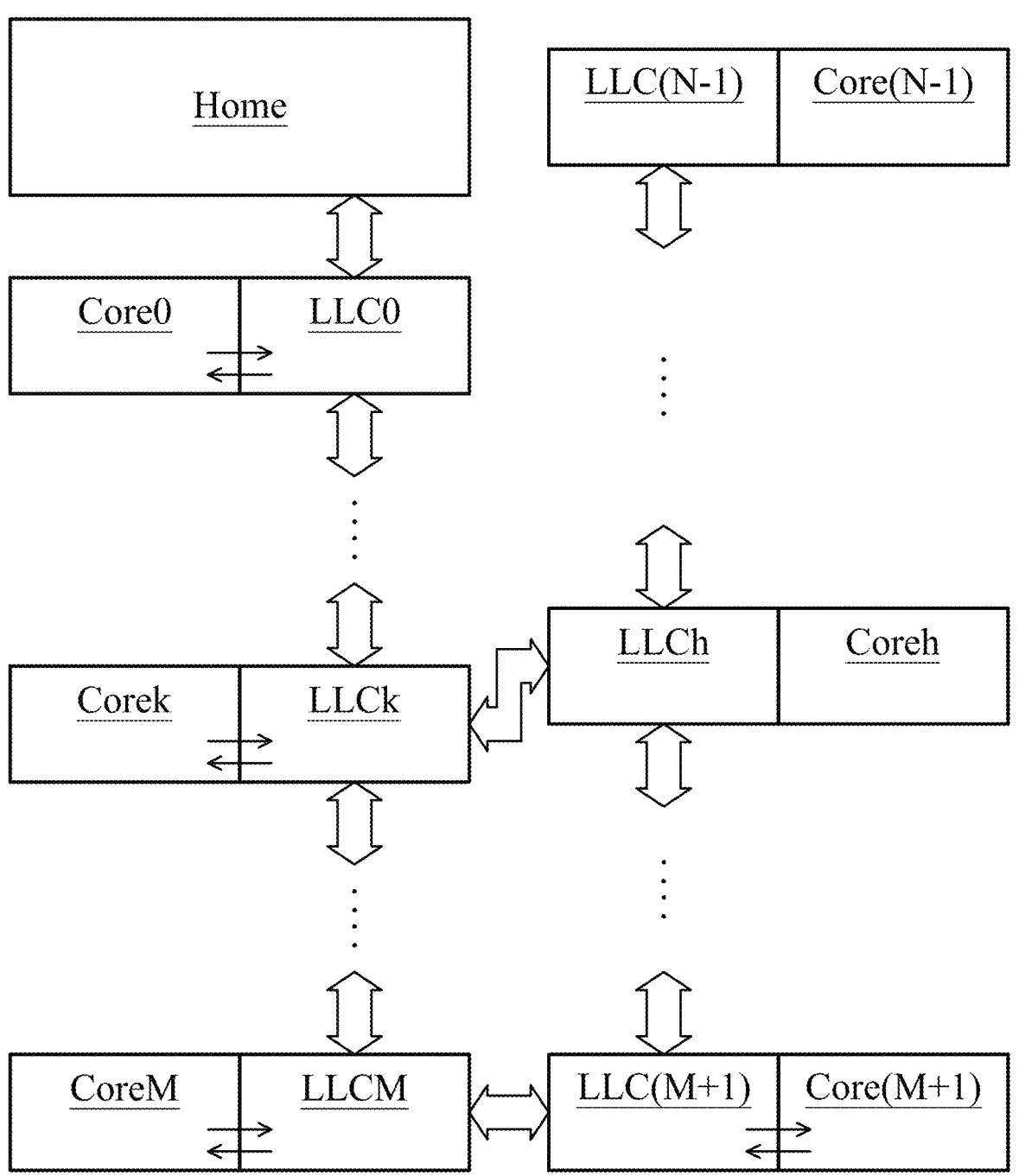
FIG. 4 illustrates an asymmetric layout for the multiple cores.

FIG. 4 illustrates an asymmetric layout for the multiple cores. Numbered from 0 to M, the cache slices LLC0~LLCM are arranged from the top row to the bottom row in the first column in the order in which they are numbered. Numbered from (M+1) to (N−1), the cache slices LLC(M+1)~LLC(N−1) are arranged from the bottom row to the top row in the second column in the order in which they are numbered. M is a number greater than 0 and less than N−2. In the two columns, the cache slices adjacent to each other in the lateral direction are connected through the mesh-type interconnection structure. For example, the cache slice LLCk (numbered k) of the core Corek is interconnected with the cache slice LLCh (numbered h) of the core Coreh, wherein with respect to the core Corek, the core Coreh is the closest core in the lateral direction.

Figure 5:
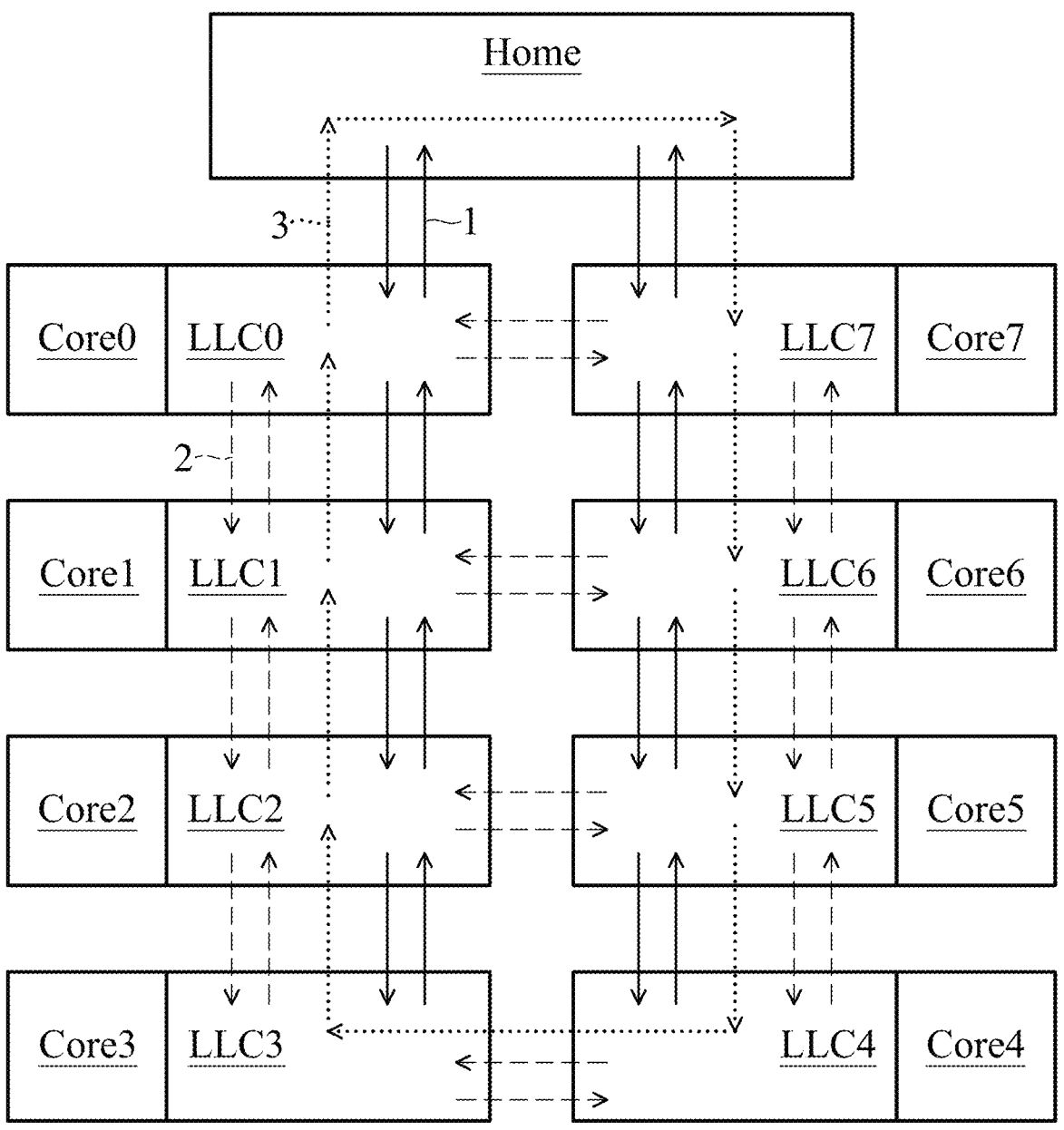
FIG. 5 illustrates that the mesh-type interconnection structure includes three types of communication lines represented by solid lines 1, dashed lines 2 and dotted lines 3, which are provided to deal with the different functional, bandwidth, and latency requirements.

The following describes the communication lines used in the mesh-type interconnection structure of the disclosure in more detail. FIG. 5 illustrates that the mesh-type interconnection structure includes three types of communication lines represented by solid lines 1, dashed lines 2 and dotted lines 3, which are provided to deal with the different functional, bandwidth, and latency requirements.

The solid lines 1 represent the second-type communication lines (e.g., implemented by single lines), which are operative to realize the communication between the primary storage node Home and the LLC (including the cache slices LLC0 to LLC7). As shown, there are a pair of second-type communication lines between the primary storage node Home and the cache slice LLC0 for bidirectional communication between the primary storage node Home and the cache slice LLC0, pairs of second-type communication lines between adjacent cache slices LLC0 to LLC3 in the first column for bidirectional communication between the adjacent cache slices LLC0 to LLC3 in the first column, a pair of second-type communication lines between the primary storage node Home and the cache slice LLC(N−1) for bidirectional communication between the primary storage node Home and the cache slice LLC(N−1), and pairs of second-type communication lines between adjacent cache slices LLC4 to LLC7 in the second column for bidirectional communication between the adjacent cache slices LLC4 to LLC7 in the second column.

The dotted lines 2 represent the first-type communication lines (e.g., implemented by single lines), which are operative to realize the communication between the cores (Core0~Core7) and the LLC (including the core slices LLC0~LLC7). As shown, the mesh-type interconnection structure includes pairs of first-type communication lines between adjacent cache slices in the first column for bidirectional communication between the adjacent cache slices LLC0~LLC3 in the first column, and pairs of first-type communication lines between adjacent cache slices in the second column for bidirectional communication between the adjacent cache slices LLC4~LLC7 in the second column. Especially, such pairs of communication lines are also provided between the laterally-aligned cache slices in the first and second columns (e.g., between LLC0 and LLC7, between LLC1 and LLC6, between LLC2 and LLC5, and between LLC3 and LLC4).

The dotted lines 3 represent the third-type communication lines (e.g., implemented by single lines), which are operative to realize the transfer of control signals. The mesh-type interconnection structure includes third-type communication lines connecting the primary storage node Home and the cache slices LLC0~LLC7 in a unidirectional manner, so as to transfer control signals.

Such a mesh-type interconnection structure provides specific communication channels to deal with the various functional, bandwidth, and latency requirements, and thus brings significant improvements to system performance.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A processor with a high-capacity last-level cache, comprising:
   a plurality of cores;
   a primary storage node;
   a plurality of cache slices corresponding to the plurality of cores, configured to form a last-level cache; and
   a mesh-type interconnection structure, configured to connect the primary storage node and the cache slices in a ring;
   wherein:
   the cache slices are arranged in a first column and a second column; and
   the mesh-type interconnection structure connects at least two pairs of cache slices, adjacent to each other in a lateral direction, in the first and second columns.

2. The processor with a high-capacity last-level cache as claimed in claim 1, wherein:
   the number of cache slices and the number of cores are both N;
   N is greater than 2;
   the cache slices are numbered from 0 to (N−1);
   the cores are numbered from 0 to (N−1);
   a ring connection formed by the primary storage node and the cache slices starts from the primary storage node, and then goes through the cache slices in numerical order, and then comes back to the primary storage node; and
   the mesh-type interconnection structure connects every pair of cache slices with non-adjacent numbers.

3. The processor with a high-capacity last-level cache as claimed in claim 2, wherein:
   N is an even number greater than 2;
   the cache slices numbered from 0 to (N/2−1) are arranged from a head row to a bottom row in the first column in an order in which they are numbered; and
   the cache slices numbered from N/2 to (N−1) are arranged from a bottom row to a head row in the second column in the order in which they are numbered.

4. The processor with a high-capacity last-level cache as claimed in claim 3, wherein:
   the cache slices in the first column are aligned laterally to the cache slices in the second column.

5. The processor with a high-capacity last-level cache as claimed in claim 4, wherein:
   the core and cache slice with the same number are connected to each other.

6. The processor with a high-capacity last-level cache as claimed in claim 5, wherein:

the cores numbered from 0 to (N/2−1) corresponding to the cache slices numbered from 0 to (N/2−1) are located on a first side of the cache slices numbered from 0 to (N/2−1); and the cores numbered from N/2 to (N−1) corresponding to the cache slices numbered from N/2 to (N−1) are located on a second side of the cache slices numbered from N/2 to (N−1), and the second side is opposite to the first side.

7. The processor with a high-capacity last-level cache as claimed in claim 6, wherein:

the primary storage node is arranged on a upper side of the first column and the second column.

8. The processor with a high-capacity last-level cache as claimed in claim 4, wherein:

the mesh-type interconnection structure includes pairs of first-type communication lines between adjacent cache slices in the first column for bidirectional communication between the adjacent cache slices in the first column, pairs of first-type communication lines between adjacent cache slices in the second column for bidirectional communication between the adjacent cache slices in the second column, and pairs of first-type communication lines between laterally-aligned cache slices in the first and second columns for bidirectional communication between the laterally-aligned cache slices in the first and second columns, so as to realize communication between the cores and the last-level cache.

9. The processor with a high-capacity last-level cache as claimed in claim 8, wherein:

the mesh-type interconnection structure includes a pair of second-type communication lines between the primary storage node and a cache slice numbered 0 for bidirectional communication between the primary storage node and the cache slice numbered 0, pairs of second-type communication lines between adjacent cache slices in the first column for bidirectional communication between the adjacent cache slices in the first column, a pair of second-type communication lines between the primary storage node and a cache slice numbered (N−1) for bidirectional communication between the primary storage node and the cache slice numbered (N−1), and pairs of second-type communication lines between adjacent cache slices in the second column for bidirectional communication between the adjacent cache slices in the second column, so as to realize communication between the primary storage node and the last-level cache.

10. The processor with a high-capacity last-level cache as claimed in claim 9, wherein:

the mesh-type interconnection structure includes third-type communication lines connecting the primary storage node and the cache slices in a unidirectional manner, so as to transfer control signals.

11. The processor with a high-capacity last-level cache as claimed in claim 3, wherein:

the mesh-type interconnection structure that connects the primary storage node and the cache slices in the ring further connects the cache slice numbered j with the cache slice numbered (N−1−j); and $j=0~[(N/2)−2]$.

12. The processor with a high-capacity last-level cache as claimed in claim 11, wherein:

N is 8.

13. The processor with a high-capacity last-level cache as claimed in claim 2, wherein:

the cache slices numbered from 0 to M are arranged from a head row to a bottom row in the first column in the order in which they are numbered;

the cache slices numbered from (M+1) to (N−1) are arranged from a bottom row to a head row in the second column in the order in which they are numbered; and M is a number greater than 0 and less than N−2.

* * * * *